G. DADD.
EDUCATIONAL DEVICE.
APPLICATION FILED JAN. 14, 1913.
1,085,405. Patented Jan. 27, 1914.
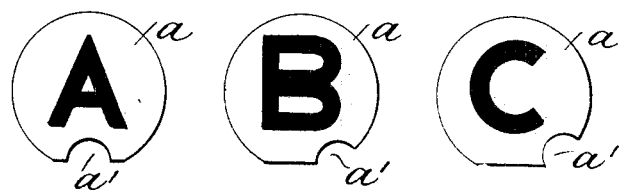
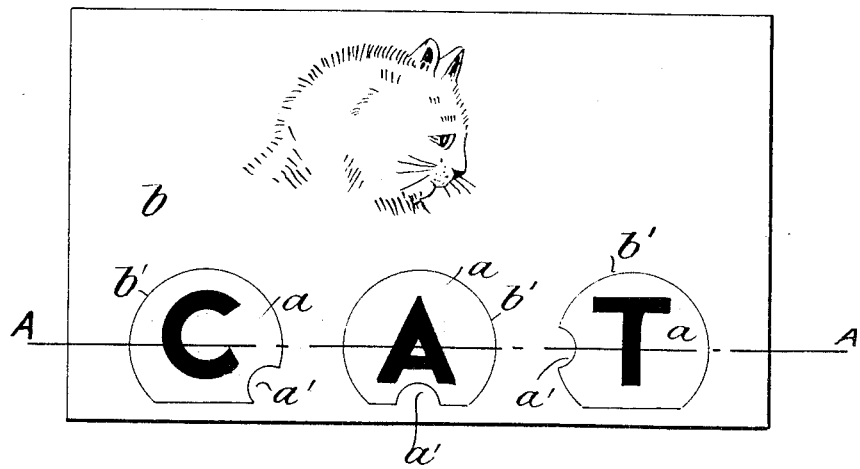
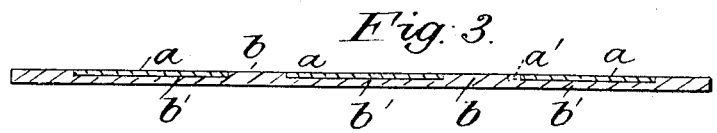
Witnesses.
Inventor.
Geoffrey Dadd,
By
F. H. Richards,
Attorney.

UNITED STATES PATENT OFFICE.

GEOFFREY DADD, OF WALLINGTON, ENGLAND.

EDUCATIONAL DEVICE.

1,085,405. Specification of Letters Patent. Patented Jan. 27, 1914.

Application filed January 14, 1913. Serial No. 742,034.

*To all whom it may concern:*

Be it known that I, GEOFFREY DADD, a subject of the King of Great Britain, residing in Wallington, in the county of Surrey, England, have invented certain new and useful Improvements in Educational Devices, of which the following is a specification.

This invention relates to an improved device for educational purposes, and it has for its object to provide a device whereby the teaching of the order of the alphabet, spelling and the meanings of words and other knowledge, may be accomplished without the aid of an instructor.

Now according to the present invention, I employ a number of blocks, disks or pieces of suitable material bearing the letters of the alphabet or other signs or words, and which are so constructed that they may be assembled only in a predetermined order or position after the manner of a puzzle. While the shape of the aforesaid blocks, disks, or pieces of material may be varied as may be found most suitable, the invention may in one form be embodied in disks with a letter upon each, the said disks presenting the outline of a segment of a circle of greater dimensions than a semicircle, and having upon its periphery indentations of circular or other form. A tablet plate card or surface is employed having recesses of the same dimensions and outline as the outline of the aforesaid disks. Each indentation is placed at a different point of the periphery of the disk, and a corresponding projection is formed in the recess destined to receive the disk. The indentations are of such dimensions that they shall not assume sufficient importance to cause a child to identify the disks by their outline rather than by the character or letter upon them. The outline of the disks and the position of the indentations is such that no two disks bearing different letters will fit the same recess. By this means by employing a card having, for example, the representation of an animal, and with recesses thereon of an outline corresponding to the disks bearing the letters spelling the animal's name, such recesses being arranged in their proper order, the child on placing the disks in their appropriate recesses will be taught automatically as it were, first how to spell the name of the animal, and assuming the animal is not known to it, both the name and how to spell it. Inasmuch as the letter upon the disk is the most prominent distinguishing feature, it may safely be assumed that the child will be more likely to remember the letters than the shape of the disks bearing them.

In order that the invention may be the better understood drawings are appended in which:—

Figure 1. shows some examples of disks employed in accordance with this invention. Fig. 2. is a plan of a card or tablet with the disks in position. Fig. 3. is a section on line A A Fig. 2.

In the accompanying drawings $a$ indicates disks such as those already referred to and which disks are segments of circles having at some portion of their periphery a recess $a^1$. The disks as already described are designed to fit cavities or recesses formed in a tablet or surface such for example as $b$, Figs. 2 and 3, and which cavities or recesses $b^1$ are of an outline corresponding to the outline of the particular disks destined to be placed therein. The tablet also bears an illustration of the object of which the name is spelled by the letters on the disks when said disks are placed in their appropriate recesses.

Obviously the system may be extended beyond the limits of the very elementary educational purposes above described, and it may be employed for the teaching of various subjects to children who are able to read. For example, cards may be provided with recesses as aforesaid, but instead of bearing letters, the various cards may bear questions or portions of questions, or answers to the questions printed upon the cards or portions of the said answers, the proper assembly of the disks providing the answers.

The shape of the disks is obviously not limited to that described, as instead of this shape, any other suitable outline may be selected. Again the disks, blocks or pieces may be intended for connection one to another, the means of connection being such that only predetermined bodies can be coupled or connected in a specified sequence or order.

Instead of printing or otherwise permanently indicating the letters, signs or words upon the disks, blocks, or the like and the tablets, plates, cards or surfaces in which the recesses are formed, the said blocks or disks and the tablets may be of such material or be provided with a surface of such a nature that the words, or the like, may be written thereon by means of chalk or other means that may be readily erased. By this means one set of disks or the like may be employed which may serve for a number of educational purposes the letters or the like being changed according to the particular subject it is desired to teach.

Claims:

1. An educational device consisting of a member adapted to carry an illustration and formed with a series of recesses, the edges of which recesses have substantially similar general outlines, each recess having a portion of its edge forming a key and located differently from the like portion of the other recesses, and disks adapted to carry letters for coöperating with said member, said edge-formed key being so arranged that no two disks excepting those bearing the same symbol will fit in one recess.

2. An educational device comprising a board having a surface provided with an illustration and having a plurality of recesses formed therein, the general outlines of the edges of the recesses being substantially similar and disks adapted to carry matter coöperating with the illustration and adapted to snugly fit in the recesses, said disks and said recess edges having coöperating interfitting portions, and notches, said interfitting portions and notches being differently located on said edges and disks, so that no two disks, excepting those bearing the same symbol will fit in one recess.

3. An educational device consisting of a board having a surface provided with recesses formed therein, said recesses having edges of substantial semi-circular formation, with portions of said edges parallel to the adjacent edge of the board, said edges having portions projecting into the recesses, and a series of disks provided with reading matter coöperating with the illustration and having edges corresponding to the edges of the recesses and notches to receive said projecting portions, said disks being so shaped that no two disks except those bearing the same symbol will fit in the same recess.

In witness whereof I have hereunto signed my name in the presence of the two undersigned witnesses.

GEOFFREY DADD.

Witnesses:
JOHN H. SARD,
EDMUND H. HARBERD.